(12) United States Patent
Hamilton

(10) Patent No.: US 8,459,566 B2
(45) Date of Patent: Jun. 11, 2013

(54) HIDDEN TAG FOR PROVIDING INFORMATION ABOUT ASSOCIATED GOODS AND SERVICES

(76) Inventor: Jennifer H. Hamilton, Northridge, CA (US)

( * ) Notice: Subject to any disclaimer, the term of this patent is extended or adjusted under 35 U.S.C. 154(b) by 176 days.

(21) Appl. No.: 12/855,570

(22) Filed: Aug. 12, 2010

(65) Prior Publication Data

US 2011/0036915 A1    Feb. 17, 2011

Related U.S. Application Data

(60) Provisional application No. 61/233,201, filed on Aug. 12, 2009.

(51) Int. Cl.
*G06K 19/06* (2006.01)

(52) U.S. Cl.
USPC ........... 235/494; 235/375; 235/487; 235/457; 283/72; 283/113

(58) Field of Classification Search
USPC .... 235/494, 454, 491, 487, 375, 457; 283/72, 283/81, 101, 113
See application file for complete search history.

(56) References Cited

U.S. PATENT DOCUMENTS

| | | | |
|---|---|---|---|
| 6,361,079 B1* | 3/2002 | Kirkman | 283/81 |
| 6,628,821 B1* | 9/2003 | Covell et al. | 382/155 |
| 7,353,994 B2* | 4/2008 | Farrall et al. | 235/454 |
| 7,789,311 B2* | 9/2010 | Jones et al. | 235/487 |
| 2003/0005304 A1* | 1/2003 | Lawandy et al. | 713/176 |
| 2005/0109850 A1* | 5/2005 | Jones | 235/487 |
| 2006/0028727 A1* | 2/2006 | Moon et al. | 359/569 |
| 2007/0170241 A1* | 7/2007 | Grant et al. | 235/375 |
| 2007/0262154 A1* | 11/2007 | Zazzu et al. | 235/487 |
| 2009/0206162 A1* | 8/2009 | De Cremer et al. | 235/491 |
| 2010/0156087 A1* | 6/2010 | Raming | 283/79 |
| 2011/0049862 A1* | 3/2011 | Hill | 283/70 |

* cited by examiner

*Primary Examiner* — Edwyn Labaze
(74) *Attorney, Agent, or Firm* — The Eclipse Group LLP

(57) ABSTRACT

The present invention relates to a method and system for creating and utilizing hidden tags on goods, associated labels and/or associated promotional materials related to such goods or to certain services that are only visible through the use of a viewing device.

8 Claims, 3 Drawing Sheets

Recycled Material

Recyclable Material

Biodegradable Material

Non-Toxic

Chemical-Free

Dye-Free

All-Natural

Organically Grown

No Animal Testing

Renewable Material

Reduces Water Consumption

| | |
|---|---|
| Ff | Fat-Free |
| Wf | Wheat-Free |
| Nf | Nut-Free |
| Df | Dairy-Free |
| Gf | Gluten-Free |
| Sf | Sugar-Free |
| K | Kosher |
| V | Vegetarian |
| O□ | Organic |

FIG. 2

HIDDEN TAG FOR PROVIDING INFORMATION ABOUT ASSOCIATED GOODS AND SERVICES

CROSS-REFERENCE TO RELATED APPLICATION

This application claims priority of U.S. Provisional application Ser. No. 61/233,201, filed on Aug. 12, 2009, titled HIDDEN TAG FOR PROVIDING INFORMATION ABOUT ASSOCIATED GOODS AND SERVICES, which application is incorporated by reference in this application in its entirety.

BACKGROUND OF THE INVENTION

1. Field of the Invention.

This invention relates to a method and system for creating hidden tags on products, associated product labels or promotional materials that are only visible through the use of a viewing device, which may include a filtering, illuminating, or distortion device. The tags provide additional information about the associated product or service that, for example, symbolizes a characteristic, quality, type, ingredient or information of or about an associated good or service.

2. Related Art.

Issues related to public and personal health and the environment are top priority for many today. Raising public awareness regarding the ever increasing need to protect and preserve our health and the environment is a high priority for today's society. As such, many organizations are now placing a strong emphasis on activities for children that raise health and environmental awareness.

With particular regard to the environment, programs and campaigns that focus on educating children on the environment typically emphasis conservation, protecting the Earth, green energy and waste management. On the other hand, most campaigns that promote purchasing healthy or allergen free foods are directed toward adults. As a result, very few, if any, programs currently aim to educate children on how to identify, select and purchase environmentally friendly products, allergen free products, or products that promote general or individual health and/or safety.

Current packaging labels and practices do identify certain product qualities and characteristics that promote environmental preservation and that provide information to consumers with particular or general health concerns. Unfortunately, a problem with current systems for identify such information is that they cannot be easily understood by younger purchasers and/or children. Children typically either do not have the ability, or the attention span, to read product labels to determine whether a product is environmentally friendly or suitable to address specific health needs or concerns. Further, adults often do not involve children in making purchasing decisions regarding consumer goods.

Accordingly, a need exists for a system and method that not only captures the attention of children but also raises children's interest in assisting adults with making environmentally friendly and health conscience purchasing decisions. A need further exists for method and system for identifying certain desirable qualities and/or characteristics of household and consumer goods and services that can be understood by children.

SUMMARY

A system and method is provided for creating and utilizing hidden tags on goods, on associated labels, or on associated promotional materials related to such goods or to certain services that are only visible through the use of a viewing device. A "tag" is any word, symbol (including letters, numbers or a combinations thereof), or image that points to a particular concept and that provides additional information about the associated product or service, which, may, for example, be a specific characteristic, quality, type or ingredient of an associated good or service.

A method for educating consumers about purchasing decisions is further provided that includes the steps of developing a tagging system that includes various tags representative of different characteristics of goods or services; creating at least one tag in the tagging system as a hidden image that is only clearly visible through the user of a visual aid device; and placing the tag on a material associated with a product or service.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 2 illustrates various symbols that could be utilized as tags for the various items.

DETAILED DESCRIPTION

A system is provided for creating and utilizing hidden tags on goods, on associated labels or on associated promotional materials related to such goods or to certain services that are only visible through the use of a viewing device. By utilizing hidden tags on goods or associated advertising or promotional material for goods and services, younger shoppers and children can become interactively engaged in assisting adults with making environmental and health conscience purchasing decisions, which will develop better buying habits in children as they mature into adults. Further, once the public, primarily our youth, become engaged in locating hidden tags on products and associated materials, the tags will become recognizable and will be automatically associated with their assigned characteristics, creating lasting symbolism for purchasers and manufacturers of retail products.

Figure 1:
FIG. 1 illustrates various examples of tags that could be used to represent the characteristics of a particular good.
Figure 1:
Figure 1:
Figure 1:
Figure 1:
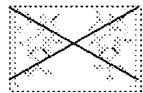
Figure 1:
Figure 1:
Figure 1:
Figure 1:
Figure 1:
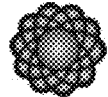
Figure 1:

A "tag" is any word, symbol (including letters, numbers or a combinations thereof), or image that points to a particular concept and that provides additional information about the associated product or service, which, may, for example, be a specific characteristic, quality, type or ingredient of an associated good or service. Tags can be made and/or developed to be any symbol that a retailer, manufacture or provider of retail products and services would like to designate a particular characteristic or quality of a good or service. Standards can be set by the retailer, manufacture, federal or local government, or community as to what type of goods and services may qualify as having a particular attribute necessary to utilize a given tag. For example, icons or caricature personalities may be developed to represented certain characteristics, which may then be further utilized to educate as to the particular environmental and health attributes to which the icons or personalities were developed By way of example only, the tags illustrated in FIG. 1 could be used to represent the following characteristics of a particular good, some of which are known symbols representing such characteristics.

Similarly, tags can be used in connection with the sale of foods. Again, any symbol may be utilized to represent a quality or characteristic of a product. For example, the symbols identified in FIG. 2 may be utilized as tags for the various items.

Once the tagging system is developed, the tags may then be created and printed on the goods or associated marketing or promotional materials for the goods or services in a manner such that the tags are either all or partially hidden or distorted from being clearly viewed by the naked eye without a visual aid device. Whether the tag is all or partially hidden, or simply distorted, for purposes of this application, such tag shall be referred to as a "hidden tag" or "hidden image".

Known methods for distorting or hiding images include: (i) layering images using different color palettes; (ii) embedding the image in a stereogram; (iii) utilizing stereographic imaging (including anaglyph and autostereographic imaging); or (iv) utilizing steganography (such as invisible ink, visible under an ultraviolet light).

Once the tags were hidden, a user would then need a visual aid device to view the tags in a clearly visible and identifiable manner. Such devices could be in the form of a small UV-light, a pair of color filtering glasses, filtering wheel, a hand-held card or magnifying glass with a filter for placing over the image or other known device for permitting the clear display of the hidden tag. When using a filter, red, blue, yellow, or polarization filters may be utilized, as an example of the implementation. To direct attention to the location or position of a tag on a product, associated marketing, or promotional materials related to a product or service, the hidden text may be enclosed within a certain area or identified region on the product or advertising or promotional material for the product or a service.

Figure 3:
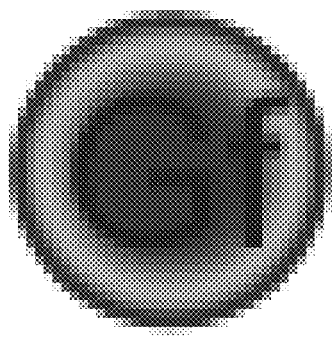
FIG. 3 illustrates an example of a hidden tag that would appear blurry but that could be seen clearly using appropriate color filters.

As an example, if a gluten-free product is labeled using this system, a red circle may be used with blue letters "Gf" overlaid on the red circle such that the Gf would not be visible to the naked eye but once an appropriate visual aid device is placed over the image having the hidden tag (i.e., a blue filter), the user will be able to clearly see the "Gf" letters overlaid on the red circle as shown in FIG. 3.

Similarly, instead of overlaying the letters Gf on the red circle, the red circle may be overlaid on the blue Gf letters or integrated within the red circle such that the visual aid device filters out the red overlaid circle to allow a user to see the blue Gf letters.

As illustrated by the above description, an engaging method is disclosed for educating consumers, including children, about product characteristics. The method includes the steps of developing a tagging system that includes various tags representative of different characteristics of goods or services, examples of such tags and characteristic representations are described above. Next, the tags are embedded into a hidden image that is only clearly visible by using a visual aid device. The tags are then placed on various products or material associated with the marketing, promotion of sale of such products or services that include the characteristics represented by the tag.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method for educating consumers about product characteristics or purchasing decisions, the method comprising:
    developing a tagging system that includes different tags representative of different characteristics of goods or services, where each tag in the tagging system represents a different characteristic of goods or services in a common category of characteristics;
    creating at least one tag in the tagging system as hidden image that is only clearly visible through the user of a visual aid device; and
    placing the tag on a consumer product in a manner that allows the hidden image to be visible through the use of the visual aid device without requiring the removal of the tag from the product.

2. The method of claim 1 where the common category is related to food ingredients.

3. The method of claim 1 where the common category is related to the environment.

4. The method of claim 1 where the common category is related to consumer health.

5. Product packaging including a hidden image that is only clearly visible through a visual aid devise, where the hidden image is a symbol that represents a characteristic of the product for which the packaging is associated, where such characteristic identifies information about the inclusion or exclusion of a specific product attribute and where the hidden image is visible through the use of the visual aid without requiring the removal of the product packaging from the product.

6. The method of claim 5 where the product attribute is related to food ingredients.

7. The method of claim 5 where the product attribute is related to the environment.

8. The method of claim 5 where the product attribute is related to consumer health.

* * * * *